(12) United States Patent
Yue et al.

(10) Patent No.: US 7,501,016 B2
(45) Date of Patent: Mar. 10, 2009

(54) GRAY INK COMPOSITION AND METHOD OF MAKING THE SAME

(75) Inventors: Shunqiong Yue, San Diego, CA (US); Howard A. Doumaux, San Diego, CA (US); Anne M. Kelly-Rowley, San Diego, CA (US)

(73) Assignee: Hewlett-Packard Development Company, L.P, Houston, TX (US)

( * ) Notice: Subject to any disclaimer, the term of this patent is extended or adjusted under 35 U.S.C. 154(b) by 234 days.

(21) Appl. No.: 11/471,269

(22) Filed: Jun. 20, 2006

(65) Prior Publication Data

US 2007/0292692 A1   Dec. 20, 2007

(51) Int. Cl.
C09D 11/00 (2006.01)
(52) U.S. Cl. .................................... 106/31.6
(58) Field of Classification Search .............. 106/31.6
See application file for complete search history.

(56) References Cited

U.S. PATENT DOCUMENTS

| | | | |
|---|---|---|---|
| 5,948,843 A | 9/1999 | Boutier | |
| 6,536,891 B2 | 3/2003 | Oyanagi | |
| 6,846,353 B2 * | 1/2005 | Sano et al. | 106/31.6 |
| 6,997,979 B2 | 2/2006 | Bauer et al. | |
| 2004/0035320 A1 * | 2/2004 | Sano et al. | 106/31.6 |
| 2004/0216638 A1 | 11/2004 | Rolly | |

* cited by examiner

*Primary Examiner*—J. A. Lorengo
*Assistant Examiner*—Veronica Faison Gee

(57) ABSTRACT

A gray ink composition includes an ink vehicle having a black pigment and at least one color pigment dispersed therein. An anionic dispersant is: a) dispersed in the ink vehicle; b) associated with at least a portion of a surface of at least one of the dispersed black pigment or the at least one dispersed color pigment; and/or c) combinations thereof. At least one of the black pigment or the color pigment(s) has an anionic surfactant that is associated with at least another portion of the surface thereof.

11 Claims, 1 Drawing Sheet

STANDARD DEVIATION IS 2%

GRAY INK COMPOSITION AND METHOD OF MAKING THE SAME

BACKGROUND

The present disclosure relates generally to gray ink compositions and methods of making the same.

Gray inks are often used when printing both color and black and white images. When printing inkjet color images, it may be beneficial to form a base using different gray ink tones, and when printing inkjet black and white (grayscale) images, many different gray ink tones may be used to achieve desirable shades.

Generally, gray inks are made by one of two ways. One technique for making gray ink includes diluting black ink. This may, however, result in the hue of the ink shifting. Another technique for making gray ink includes mapping colors (magenta, cyan, and/or yellow) onto the media to obtain the desired hue.

Mapping multiple colored inks may, in some instances, result in a high ink flux on the media that may cause a loss of detail in dark areas. Furthermore, images printed with colored inks to map out neutral and gray areas may be subject to degradation. This may be due, at least in part, to a different lighffastness of each of the individual colors that make up the composite black. Furthermore, when a three-ink system is used, the inks often have a high colorant load in order to achieve adequate chroma, which may result in high grain. Furthermore, it may be difficult to maintain color consistency of neutral grays due, in part, to changing pen drop volumes of the different colors. When two-pen, six-ink (CMYcmk) systems are used, the printed images may, in some instances, take on the hue of the inks in the pen with the higher drop weight. These defects are generally predominant in gray and neutral areas of an image. In some instances, the multi-colorant inks cause the grayscale to be unbalanced, resulting in color-shifted images.

As such, it would be desirable to provide a gray ink that, when printed, is capable of maintaining color consistency and neutrality.

BRIEF DESCRIPTION OF THE DRAWINGS

Objects, features and advantages of embodiment(s) of the present disclosure will become apparent by reference to the following detailed description and drawing, in which.

DETAILED DESCRIPTION

Figure 1:
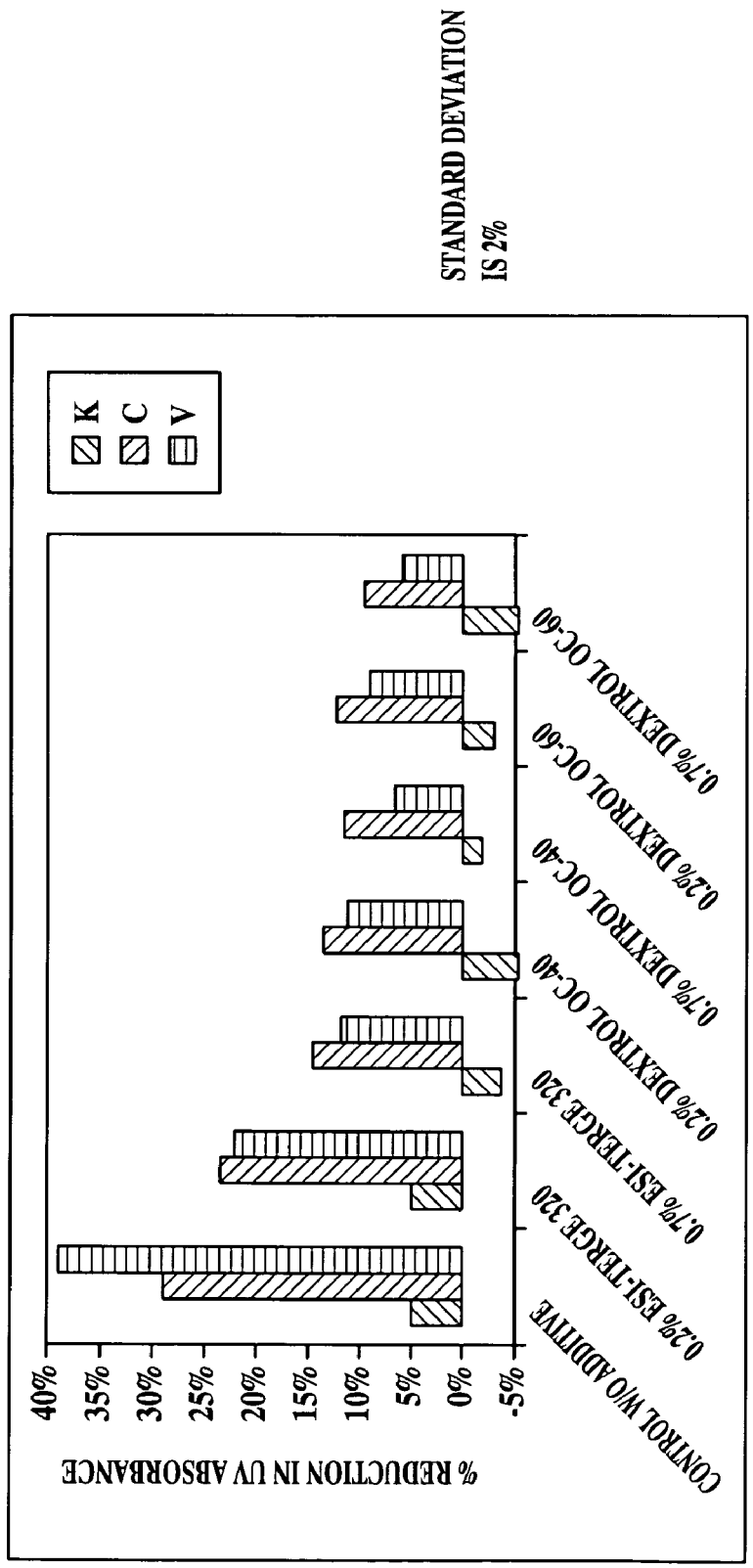
FIG. 1 is related to an embodiment of the present disclosure, specifically, it is a graph depicting percent reduction in UV absorbance for a control ink and inks containing anionic surfactants attached to pigments.

Embodiments of the ink composition advantageously include anionic surfactants associated with (one non-limiting example of which association is via adsorption) at least a portion of the surfaces of the pigments. Without being bound to any theory, it is believed that the addition of the surfactants substantially improves the pigment stability (e.g., electrosteric stability) and minimizes uneven settling of the pigments. It is further believed that images formed with embodiments of the ink composition have substantially less hue shift and optical density loss over time. Furthermore, the neutrality and color of the printed gray ink is substantially consistent.

Generally, an embodiment of the gray ink composition includes an ink vehicle having a black pigment and at least one color pigment dispersed therein. An anionic dispersant aids in dispersion of, and/or associates with a surface of at least some of the pigment(s) particles, and an anionic surfactant is associated with another portion of the surface of at least some of the dispersed pigments.

An ink vehicle that includes pigments having different types and amounts of dispersants (e.g., anionic polymers) associated therewith (e.g., attached thereto or coated thereon) may be relatively unbalanced. Those pigment particles having more dispersants attached thereto tend to be more stable. The addition of anionic surfactants to stabilize such an ink vehicle seems counterintuitive, as two anionic species (e.g., the anionic dispersant and the anionic surfactant) typically repel each other. However, without being bound to any theory, it is believed that the anionic surfactants have a tendency to associate with and stabilize those pigments having fewer dispersants attached thereto, thereby substantially balancing the ink vehicle.

As used herein, the singular forms of the articles "a," "an," and "the" include plural referents unless the content clearly dictates otherwise. Further, the phrase "effective amount," as used herein, refers to the minimal amount of a substance and/or agent, which is sufficient to achieve a desired and/or required effect. For example, an effective amount of an "ink vehicle" is the minimum amount required in order to create an ink composition, while maintaining properties suitable for effective inkjet printing.

"Liquid vehicle" or "ink vehicle," as used herein, refers to the vehicle in which colorant is placed to form an ink. A wide variety of ink vehicles may be used with the compositions, systems, and methods according to embodiments disclosed herein. Suitable ink vehicles may include, but are not limited to surfactants, solvents, co-solvents, buffers, biocides (a non-limiting example of which is commercially available under the tradename PROXEL GXL (a solution of 1,2-benzisothiazolin-3-one) from Avecia Inc. located in Wilmington, Del.), sequestering agents, viscosity modifiers, surface-active agents, chelating agents, resins, and/or water, and/or combinations thereof.

In an embodiment, the ink vehicles may include 2-ethyl-2-(hydroxymethyl)-1,3-propanediol, 2-pyrrolidone, 1,5-pentanediol, glycerol, 1,2-hexanediol, tris(Hydroxymethyl)aminomethane, ethylenediaminetetraacetic acid, low molecular weight glyceryl polyoxyethyl ether (LEG-1), SURFYNOL 440 (a nonionic surfactant commercially available from Air Products and Chemicals, Inc. located in Allentown, Pa.), Zonyl® FSO (a nonionic fluorosurfactant commercially available from Dupont located in Wilmington, Del.), styrene maleic anhydride copolymers, and/or combinations thereof.

The gray ink composition has predetermined effective amounts of a black pigment and at least one color pigment (e.g., cyan, violet, magenta, red, orange, yellow, green, or blue pigments, or combinations thereof. It is to be understood that the gray ink exhibits a hue, and that the predetermined effective amounts of the pigments may be altered to change the hue of the gray ink.

In an embodiment, the predetermined effective amount of black pigment has a pigment load sufficient to provide visible absorbance at peak maxima ranging between about 0.01 and about 0.3 at a 1:2,500 dilution of ink:diluent. The term "diluent" as used herein is intended to include water, a vehicle, and/or any other liquid suitable to dilute the ink to a desired dilution, and/or combinations thereof. It is to be understood that various black pigments may be used in the gray ink composition. Non-limiting examples of black pigments include water dispersible sulfur pigments such as Solubilized Sulfur Black 1, materials such as carbon black (non-limiting examples of which include FW18, FW2, FW1, FW200 (all manufactured by Degussa Inc. located in Düsseldorf); Monarch 1100, Monarch 700, Monarch 800, Monarch 1000, Monarch 880, Monarch 1300, Monarch 1400, Regal 400R, Regal 330R, Regal 660R (all manufactured by Cabot Corporation located in Boston, Mass.); Raven 5750, Raven 250, Raven 5000, Raven 3500, Raven 1255, Raven 700 (all manufactured by Columbian Chemicals, Co. located in Marietta, Ga.)) or derivatives of carbon black.

Generally, the color pigment or combination of color pigments has a pigment load that is a fraction of the pigment load of the black pigment. As such, the amount of color pigment may depend, at least in part, on the amount of black pigment used, and the desired shade (e.g., light, medium, dark) of the gray ink.

In an embodiment, the color pigments include a combination of cyan pigment and violet pigment. Various cyan pigments may be used in the gray ink composition. Non-limiting examples of cyan pigments include copper or nickel phthalocyanine pigments, such as Pigment Blue 15:3 (PB 15:3), PB 15:4, or a derivative of copper phthalocyanine. In this embodiment, the predetermined effective amount of cyan pigment has a pigment load sufficient to provide visible absorbance at peak maxima ranging between about 0.001 and about 0.1 at a 1:2,500 dilution of ink:diluent.

In this embodiment, the predetermined effective amount of violet pigment has a pigment load sufficient to provide visible absorbance at peak maxima ranging between about 0.005 and about 0.2 at a 1:2,500 dilution of ink:diluent. Non-limiting examples of violet ink include quinacridone pigment, PV19, PV23, PV37, PV42, PV3, PV32, PV36, PV 38 or combinations thereof.

One non-limiting example embodiment of the gray ink disclosed herein includes an effective amount of black pigment sufficient to provide visible absorbance at a peak maxima of about 0.07, an effective amount of cyan pigment sufficient to provide visible absorbance at a peak maxima of about 0.025, and an effective amount of violet pigment sufficient to provide visible absorbance at a peak maxima of about 0.02.

In another embodiment, the color pigments include a combination of the previously described cyan pigment and a magenta pigment. Examples of suitable magenta pigments include, but are not limited to PR122, PR192, PR202, PR206, PR207, PR209, PR43, PR194, PR112, PR123, PR168, PR184, PR5, PR7, PR12, PR48, PR57, PR57:1, or combinations thereof. In this embodiment, the predetermined effective amount of magenta pigment has a pigment load sufficient to provide visible absorbance at peak maxima ranging between about 0.001 and about 0.2 at a 1:2,500 dilution of ink:diluent.

In still another embodiment, the color pigment is a blue pigment. The predetermined effective amount of blue pigment has a pigment load sufficient to provide visible absorbance at peak maxima ranging between about 0.001 and about 0.1 at a 1:2,500 dilution of ink:diluent. Non-limiting examples of blue pigment include Pigment Blue 15:6 (PB 15:6), PB60, PB1, PB2, PB3, PB16, PB22, PB 15:34, PB80, and PB76.

Any suitable anionic surfactant that is capable of associating with one or more of the pigment surfaces in the ink composition may be used. Examples of such anionic surfactants include, but are not limited to phosphates, sulfonates, and/or combinations thereof. Specific non-limiting examples include nonyl phenol ethoxylate phosphate; phosphate esters of nonionic adducts; phosphate esters of polyoxyethylene adducts; dodecyl benzene sulfonic acid, sodium salt; dodecyl sulfate, sodium salt; N-lauroyl sarcosine, sodium salt; sodium laureth sulfate; sodium trideceth sulfate; sodium myreth sulfate; and/or combinations thereof.

In an embodiment of the method for forming the gray ink composition, the pigments (black and color) and the anionic dispersant (a non-limiting example of which includes acrylic polymers) are dispersed into an ink vehicle. Generally, the anionic dispersant aids in, or is the primary mechanism for, dispersing the pigments throughout the ink vehicle. Alternatively or additionally, some of the anionic dispersant associates with (e.g., adsorbs or coats) at least a portion of the surface(s) of the pigment(s).

The anionic surfactant is generally added into the ink vehicle after pigment dispersion. The anionic surfactant associates with at least one of the pigment (black and/or color) surfaces. It is to be understood that the anionic surfactant generally associates with those areas/portions of the pigment surface that are not associated with the anionic dispersant. It is to be further understood that some of the anionic surfactant may also associate with those area/portions of the pigment surface having polymeric material associated therewith. As used herein, the phrase "associated with" refers to adsorbing, adhering, bonding, or the like, to a surface of the dispersed pigment. Without being bound to any theory, it is believed that the anionic surfactant advantageously stabilizes at least some of the pigments and balances the pigment dispersion in the ink vehicle by associating with less stable pigment particles.

In an embodiment of an inkjet system, an embodiment of the gray ink composition is established on at least a portion of a suitable substrate. It is to be understood that any substrate may be selected that is suitable for having indicia (e.g. alphanumeric indicia and/or graphical indicia) printed thereon. In an embodiment, the substrate is paper (non-limiting examples of which include plain copy paper or papers having recycled fibers therein) or photopaper (non-limiting examples of which include polyethylene or polypropylene extruded on one or both sides of paper), and/or combinations thereof. In an embodiment, the substrate has a thickness along substantially the entire length ranging between about 0.025 mm and about 0.5 mm. Other examples of suitable substrate materials includes vinyl materials, polymeric materials (a non-limiting example of which includes TYVEK which is commercially available from Dupont located in Wilmington, Del.), canvas materials, metal materials, or the like, or combinations thereof.

When printed on a substrate, embodiments of the gray ink composition have substantially consistent color and neutrality.

To further illustrate embodiment(s) of the present disclosure, various examples are given herein. It is to be understood that these examples are provided for illustrative purposes and are not to be construed as limiting the scope of the disclosed embodiment(s).

EXAMPLES

Many gray ink compositions were formed. One of the gray ink compositions (i.e., the control) did not include an anionic surfactant attached to the pigments. The other gray ink compositions included different amounts of anionic surfactants attached to the pigments. Each of the ink compositions included the ingredients listed in Table 1 (with the non-control inks further including an anionic surfactant attached to pigment).

TABLE 1

Composition of Inks without Anionic Surfactant

| Ingredients | Concentration |
|---|---|
| Black pigment | 2.09 |
| Cyan pigment | 0.495 |
| Violet pigment | 0.395 |
| Biocide | 0.15 |
| Glyceryl polyoxyethyl ether | 3 |
| 2-pyrrolidone | 6 |
| Glycerol | 5 |
| 1,2-hexanediol | 4 |
| Non-ionic surfactant | 0.65 |
| Non-ionic fluorosurfactant | 0.17 |
| Triethanol amine (TEA) | 0.5 |
| diethylene glycol | 5.6 |
| Styrene maleic anhydride copolymer | 0.8 |
| Water | 74.13 |

0.2% or 0.7% of anionic surfactants were added to the non-control ink compositions. The anionic surfactants used were ESI TERGE 330 (commercially available from Cook Composites and Polymers, located in Kansas City, Mo.), DEXTROL OC 40 (commercially available from Dexter Chemical, LLC located in Bronx, N.Y.), and DEXTROL OC 60 (commercially available from Dexter Chemical, LLC located in Bronx, N.Y.).

The ink compositions were centrifuged at 4000 rpm for about 0.5 hours as a qualitative stability measure, to simulate long storage life (about 1.5 years). The reduction in UV absorbance was measured. FIG. 1 is a graph depicting the percent reduction in UV absorbance for each of the inks. Table 2 depicts the percentage change in absorbance for each of the inks. The results shown in FIG. 1 and Table 2 indicate that pigment loss is reduced in those inks having the anionic surfactant attached to the pigments.

TABLE 2

% Change of Absorbance

| Ink | UV % Change Black Pigment | UV % Change Cyan Pigment | UV % Change Violet Pigment |
|---|---|---|---|
| Control without additive | 5 | 29 | 39 |
| 0.2% ESI Terge 320 | 5 | 23 | 22 |
| 0.7% ESI Terge 320 | −4 | 14 | 12 |
| 0.2% Dextrol OC-40 | −5 | 14 | 11 |
| 0.7% Dextrol OC-40 | −2 | 11 | 7 |
| 0.2% Dextrol OC-60 | −3 | 12 | 9 |
| 0.7% Dextrol OC-60 | −5 | 10 | 6 |

While several embodiments have been described in detail, it will be apparent to those skilled in the art that the disclosed embodiments may be modified. Therefore, the foregoing description is to be considered exemplary rather than limiting.

What is claimed is:

1. A gray ink composition, comprising:
an ink vehicle;
a black pigment dispersed in the ink vehicle;
at least two color pigments dispersed in the ink vehicle;
an anionic dispersant: a) dispersed in the ink vehicle; b) associated with at least one portion of a surface of either the dispersed black pigment or at least one of the at least two dispersed color pigments; or c) combinations thereof; and
an anionic surfactant which adsorbs to or coats at least one other portion of the surface of either the dispersed black pigment or at least one of the at least two dispersed color pigments; or combinations thereof;
wherein the at least two color pigments include a cyan pigment having a pigment load sufficient to provide visible absorbance at peak maxima ranging between about 0.001 and about 0.1 at a 1:2,500 dilution of the ink:diluent; and at least one of a violet pigment having a pigment load sufficient to provide visible absorbance at peak maxima ranging between about 0.005 and about 0.2 at a 1:2,500 dilution of the ink:diluent, and a magenta pigment having a pigment load sufficient to provide visible absorbance at peak maxima ranging between about 0.001 and about 0.2 at a 1:2,500 dilution of the ink:diluent;
and wherein the at least one other portion of the pigment surface adsorbed with or coated by the surfactant is different than the at least one portion associated with the anionic dispersant.

2. The gray ink composition as defined in claim 1 wherein the anionic surfactant is selected from phosphates, sulfonates, and combinations thereof.

3. The gray ink composition as defined in claim 1 wherein the anionic surfactant is selected from nonyl phenol ethoxylate phosphate; phosphate esters of nonionic adducts; phosphate esters of polyoxyethylene adducts; dodecyl benzene sulfonic acid, sodium salt; dodecyl sulfate, sodium salt; N-lauroyl sarcosine, sodium salt; sodium laureth sulfate; sodium trideceth sulfate; sodium myreth sulfate; and combinations thereof.

4. The gray ink composition as defined in claim 1 wherein the gray ink composition is adapted to be printed on a substrate, and wherein neutrality of the printed gray ink is substantially consistent.

5. The gray ink composition as defined in claim 1 wherein the black pigment has a pigment load sufficient to provide visible absorbance at peak maxima ranging between about 0.01 and about 0.3 at a 1:2,500 dilution of the ink:diluent.

6. The gray ink composition as defined in claim 1 wherein the anionic surfactant is adapted to substantially enhance stability of the pigment with which it is associated.

7. The gray ink composition as defined in claim 1 wherein the anionic dispersant is selected from acrylic polymers, styrene maleic anhydride, styrene acrylics, anionic polyurethanes, and combinations thereof.

8. A method of making a gray ink composition, comprising:
dispersing predetermined effective amounts of each of a black pigment and at least two color pigment into an ink vehicle;
adding an anionic dispersant to the ink vehicle, wherein the anionic dispersant: a) disperses in the ink vehicle; b) associates with at least one portion of a surface of either the dispersed black pigment or at least one of the at least two dispersed color pigments; or c) combinations thereof; and
adding an anionic surfactant to the ink vehicle, thereby adsorbing or coating the anionic surfactant onto at least one other portion of the surface of either the dispersed black pigment or at least one of the at least two dispersed color pigments, or combinations thereof;
wherein the predetermined effective amount of black pigment has a pigment load sufficient to provide visible absorbance at peak maxima ranging between about 0.01 and about 0.3 at a 1:2,500 dilution of the ink:diluent;

wherein the at least two color pigments include a cyan pigment having a pigment load sufficient to provide visible absorbance at peak maxima ranging between about 0.001 and about 0.1 at a 1:2,500 dilution of the ink:diluent; and at least one of a violet pigment having a pigment load sufficient to provide visible absorbance at peak maxima ranging between about 0.005 and about 0.2 at a 1:2,500 dilution of the ink:diluent, and a magenta pigment having a pigment load sufficient to provide visible absorbance at peak maxima ranging between about 0.001 and about 0.2 at a 1:2,500 dilution of the ink:diluent;

and wherein the at least one other portion of the pigment surface adsorbed with or coated by the surfactant is different than the at least one portion associated with the anionic dispersant.

9. The method as defined in claim 8 wherein the gray ink exhibits a hue, and wherein the method further comprises altering the predetermined amounts of pigments to change the hue.

10. An ink system, comprising:

a substrate; and a gray ink established on at least a portion of the substrate, the gray ink including;

an ink vehicle;

a black pigment dispersed in the ink vehicle;

at least two color pigments dispersed in the ink vehicle;

an anionic dispersant: a) dispersed in the ink vehicle; b) associated with at least one portion of a surface of either the dispersed black pigment or at least one of the at least two dispersed color pigments; or c) combinations thereof; and an anionic surfactant adsorbed to or coating at least one other portion of the surface of either the dispersed black pigment or at least one of the at least two dispersed color pigments, or combinations thereof;

wherein the black pigment has a pigment load sufficient to provide visible absorbance at peak maxima ranging between about 0.01 and about 0.3 at a 1:2,500 dilution of the ink:diluent;

wherein the at least two color pigments include a cyan pigment having a pigment load sufficient to provide visible absorbance at peak maxima ranging between about 0.001 and about 0.1 at a 1:2,500 dilution of the ink:diluent; and at least one of a violet pigment having a pigment load sufficient to provide visible absorbance at peak maxima ranging between about 0.005 and about 0.2 at a 1:2,500 dilution of the ink:diluent, and a magenta pigment having a pigment load sufficient to provide visible absorbance at peak maxima ranging between about 0.001 and about 0.2 at a 1:2,500 dilution of the ink:diluent;

and wherein the at least one portion of the pigment surface adsorbed with or coated by the surfactant is different than the at least one other portion associated with the anionic dispersant.

11. The ink system as defined in claim 10 wherein neutrality of the established gray ink is substantially consistent.

* * * * *

UNITED STATES PATENT AND TRADEMARK OFFICE
CERTIFICATE OF CORRECTION

PATENT NO. : 7,501,016 B2
APPLICATION NO. : 11/471269
DATED : March 10, 2009
INVENTOR(S) : Shunqiong Yue et al.

It is certified that error appears in the above-identified patent and that said Letters Patent is hereby corrected as shown below:

On the face page, in field (73), in "Assignee", in column 1, line 2, delete "L.P," and insert -- L.P., --, therefor.

In column 7, line 25, in Claim 10, delete "including;" and insert -- including: --, therefor.

Signed and Sealed this

Fifth Day of October, 2010

David J. Kappos
*Director of the United States Patent and Trademark Office*